(12) United States Patent
Benjelloun

(10) Patent No.: US 10,965,168 B2
(45) Date of Patent: Mar. 30, 2021

(54) FIBO ELECTROMAGNETIC FIELD HARVESTER

(71) Applicant: BIO CELLULAR DESIGN AERONAUTICS AFRICA SA, Casanearshore (MA)

(72) Inventor: Kamal M. Benjelloun, Sedona, AZ (US)

(73) Assignee: BIO CELLULAR DESIGN AERONAUTICS AFRICA SA, Casanearsbore (MA)

( * ) Notice: Subject to any disclaimer, the term of this patent is extended or adjusted under 35 U.S.C. 154(b) by 76 days.

(21) Appl. No.: 16/178,780

(22) Filed: Nov. 2, 2018

(65) Prior Publication Data

US 2019/0140486 A1  May 9, 2019

Related U.S. Application Data

(60) Provisional application No. 62/580,645, filed on Nov. 2, 2017.

(51) Int. Cl.
| | |
|---|---|
| *H02J 50/30* | (2016.01) |
| *H02J 50/40* | (2016.01) |
| *H02J 50/20* | (2016.01) |
| *H02J 7/35* | (2006.01) |
| *H02J 7/02* | (2016.01) |

(52) U.S. Cl.
CPC ............. *H02J 50/30* (2016.02); *H02J 7/35* (2013.01); *H02J 50/20* (2016.02); *H02J 50/40* (2016.02); *H02J 7/025* (2013.01)

(58) Field of Classification Search
CPC .. H02J 50/10; H02J 50/20; H02J 50/30; H02J 50/40; H02J 7/025; H02J 7/00; H01L 31/04; H01L 31/18; H01L 31/0725; H01L 31/0735; H01L 31/0745; H01L 51/42; H01L 51/4253; H01L 51/0036
USPC ....................... 307/104, 149, 9.1, 31, 43, 38
See application file for complete search history.

(56) References Cited

U.S. PATENT DOCUMENTS

| | | | | |
|---|---|---|---|---|
| 2013/0063806 | A1* | 3/2013 | Sudo | G02F 2/00 359/325 |
| 2014/0366927 | A1* | 12/2014 | Lavrova | H01Q 1/248 136/244 |
| 2015/0028365 | A1* | 1/2015 | Kurtin | C09K 11/025 257/88 |
| 2015/0083180 | A1* | 3/2015 | Lang | H01L 35/30 136/207 |
| 2015/0256118 | A1* | 9/2015 | Knowles | H01L 31/042 310/339 |

(Continued)

*Primary Examiner* — Hal Kaplan
*Assistant Examiner* — Jagdeep S Dhillon
(74) *Attorney, Agent, or Firm* — Leason Ellis LLP

(57) ABSTRACT

In one or more particular implementations, a plurality of energy harvesting cells are provided, wherein each cell comprising a substrate supporting a least one electrical energy generating device, at least one control circuit for controlling at least the operation of the electrical energy generating device, wherein the energy harvesting cell is encased in a polymer Wherein the substrate has two opposing first sides each having a length L, a second side orthogonal to both first sides having a length equal to 2L, a third side opposed from the second side having a length of 4L, wherein the width of the substrate between the two opposing first sides is 8L.

17 Claims, 7 Drawing Sheets

(56) References Cited

U.S. PATENT DOCUMENTS

2015/0299852 A1* 10/2015 Ozkan .................... B82Y 10/00
                                                           136/255
2016/0233448 A1*  8/2016 Yang ................... H01L 51/4253
2016/0346556 A1* 12/2016 Slepian ................. A61N 1/3785
2018/0073168 A1*  3/2018 Gladish ................ H01R 13/035

* cited by examiner

FIG.5 (big diamond shape)

FIG. 6 (small diamond shape)

FIBO ELECTROMAGNETIC FIELD HARVESTER

CROSS-REFERENCE TO RELATED APPLICATION

The present application claims priority to U.S. Provisional Application Ser. No. 62/580,645, filed on Nov. 2, 2017 and hereby incorporates by reference the same as if presented in its entirety.

FIELD OF THE INVENTION

The foregoing disclosure is directed to energy harvesting apparatuses and system and methods for utilizing the same.

BACKGROUND OF THE INVENTION

There is much interest in obtaining energy from renewable sources. Each year new records are set for energy produced from renewable sources, such as solar and wind. However, solar and wind installations suffer various drawbacks. For example, traditional solar photovoltaic cells are incapable of utilizing infrared light to generate electricity. Infrared accounts for a substantial portion of the electromagnetic energy that the sun provides the Earth. That energy is not currently captured. Furthermore, solar devices positioned at optimal locations (such as near the equator) suffer from excess heating due to direct sunlight exposure. This heating can impact performance and eventually damage the electronic components incorporated into the photovoltaic cell.

Thus, what is needed in the art are energy harvesting devices that not only utilizes a larger spectrum of solar energy, but also make use of the thermal energy that is incident to upon the energy collectors.

Additionally, within some environments, there are excesses of RF frequencies. For example, in urban environments, radio and microwave communication signals are a constant presence. These RF frequencies can be harvested and used to power monitoring and control apparatus. For instance, in addition to providing power sources for remote/portable devices, a suitable RF harvesting device can re-convert unused ambient RF energy to reduce overall energy demand by replacing batteries and other remote power sources.

Thus, what is needed in the art are energy harvesting devices that can also harvest RF frequencies and optionally use the harvested energy to power control and communication devices.

SUMMARY OF THE INVENTION

The following summary of the invention is provided in order to give a basic understanding of some aspects and features of the invention. This summary is not an extensive overview of the disclosure or embodiments provided herein, and as such, it is not intended to particularly identify key or critical elements of the invention, or to delineate the scope of the invention. Its sole purpose is to present some concepts of the invention in a simplified form as a prelude to the more detailed description that is presented below.

In one particular implementation, a plurality of energy harvesting cells is provided. Here, each energy harvesting cell comprises a substrate supporting a least one electrical energy generating device, at least one control circuit for controlling at least the operation of the electrical energy generating device, wherein the energy harvesting cell is encased in a polymer. In a further aspect, the substrate has two opposing first sides each having a length L, a second side orthogonal to both first sides having a length equal to 2L, a third side opposed from the second side having a length of 4L, wherein the width of the substrate between the two opposing first sides is 8L.

BRIEF DESCRIPTION OF THE DRAWINGS

The energy harvesting apparatus is illustrated in the figures of the accompanying drawings which are meant to be exemplary and not limiting, in which like references are intended to refer to like or corresponding parts, and in which.

DETAILED DESCRIPTION OF CERTAIN EMBODIMENTS OF THE INVENTION

By way of overview, various embodiments of the apparatus, systems and methods described herein are directed to providing an energy harvesting apparatus or a collection of energy harvesting devices. For example, and in no way limiting to any other implementations or configurations, the one or more energy harvesting devices having dimensions informed by Fibonacci sequences are provided. In a particular implementation, the dimensions of the energy harvesting device are multiples of a common whole number.

Figure 1:
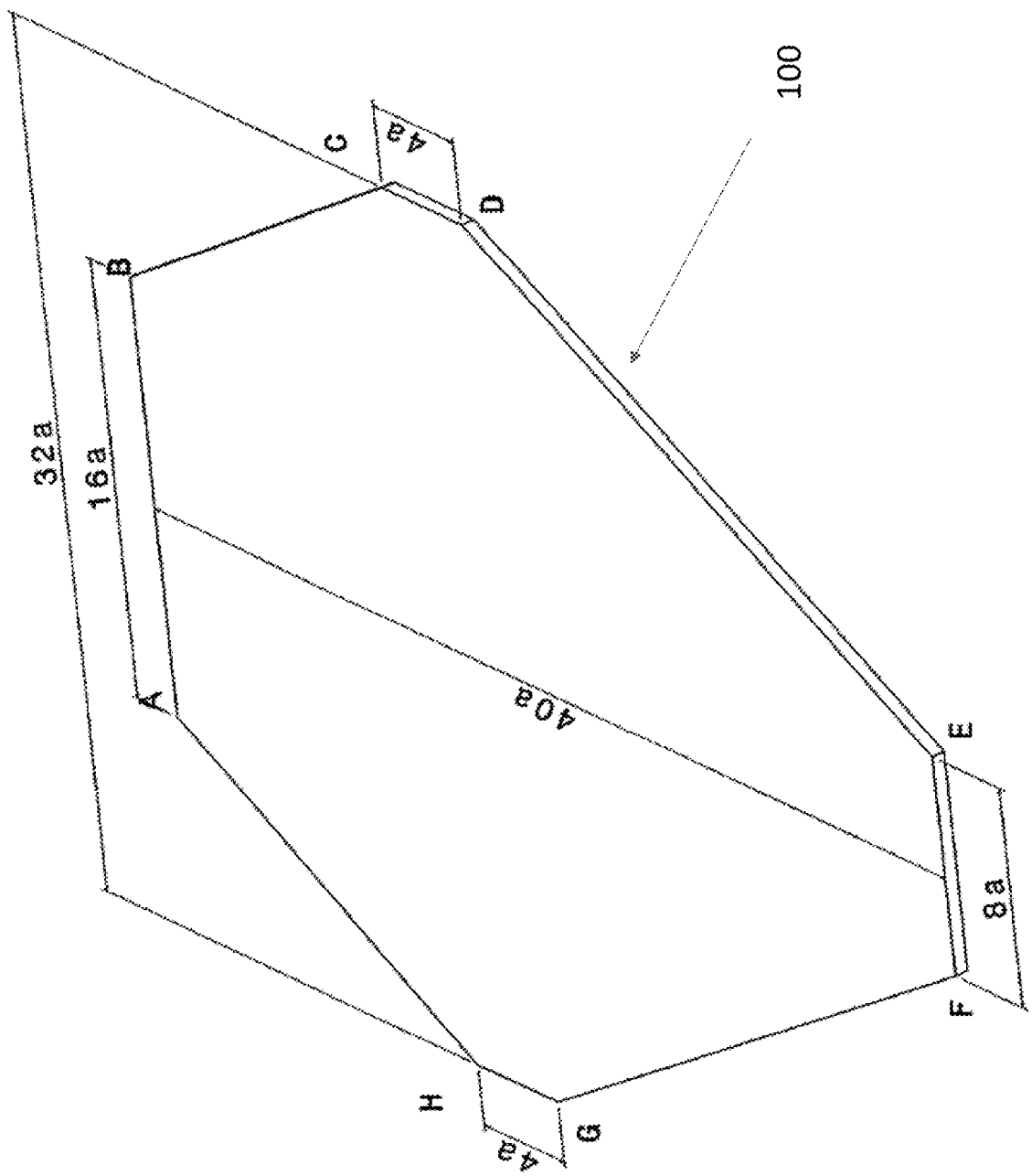
FIG. 1 shows a general overview of the energy harvesting apparatus according to a particular embodiment of the present invention.

As shown with respect to FIG. 1, an energy harvesting apparatus 100 is configured to receive energy from an energy source. In one implementation, the energy source (not shown) is the sun or other source of electromagnetic radiation. As depicted, the energy harvesting apparatus 100 has a first surface configured to receive or intercept electromagnetic energy. For instance, an energy receiving surface of the energy harvesting apparatus 100 is configured as a panel or other generally planer shape.

In one particular implementation, the energy harvesting apparatus includes a structure for supporting the energy harvesting elements. For instance, the energy harvesting apparatus is sphere, cylinder, cuboid, cone, hexagonal prism, square based pyramid, triangular based pyramid or other structure. In the illustrated implementation of FIG. 1, the energy harvesting apparatus 100 is a cuboid structure that has a plurality of sides. In a further configuration, the energy harvesting apparatus 100 is configured such that each side is has a length that is a multiple of the whole number represented by the variable "a." While the precise dimensions of "a" can vary based on intent and function, in one or more particular implementations, "a" can be between 1 centimeter and 1 meter in length or any value therein. As shown in FIG. 1, at least two sides of the energy harvesting apparatus 100 (GH and DC) have lengths equal to 4a. Likewise, sides FE and AB, which are orthogonal to GH and DC, have sides equal to 8a and 16a respectively. Furthermore, in one particular implementation, the total width of the energy harvesting apparatus 100 is 32a, while the total length is 40a.

Figure 2:
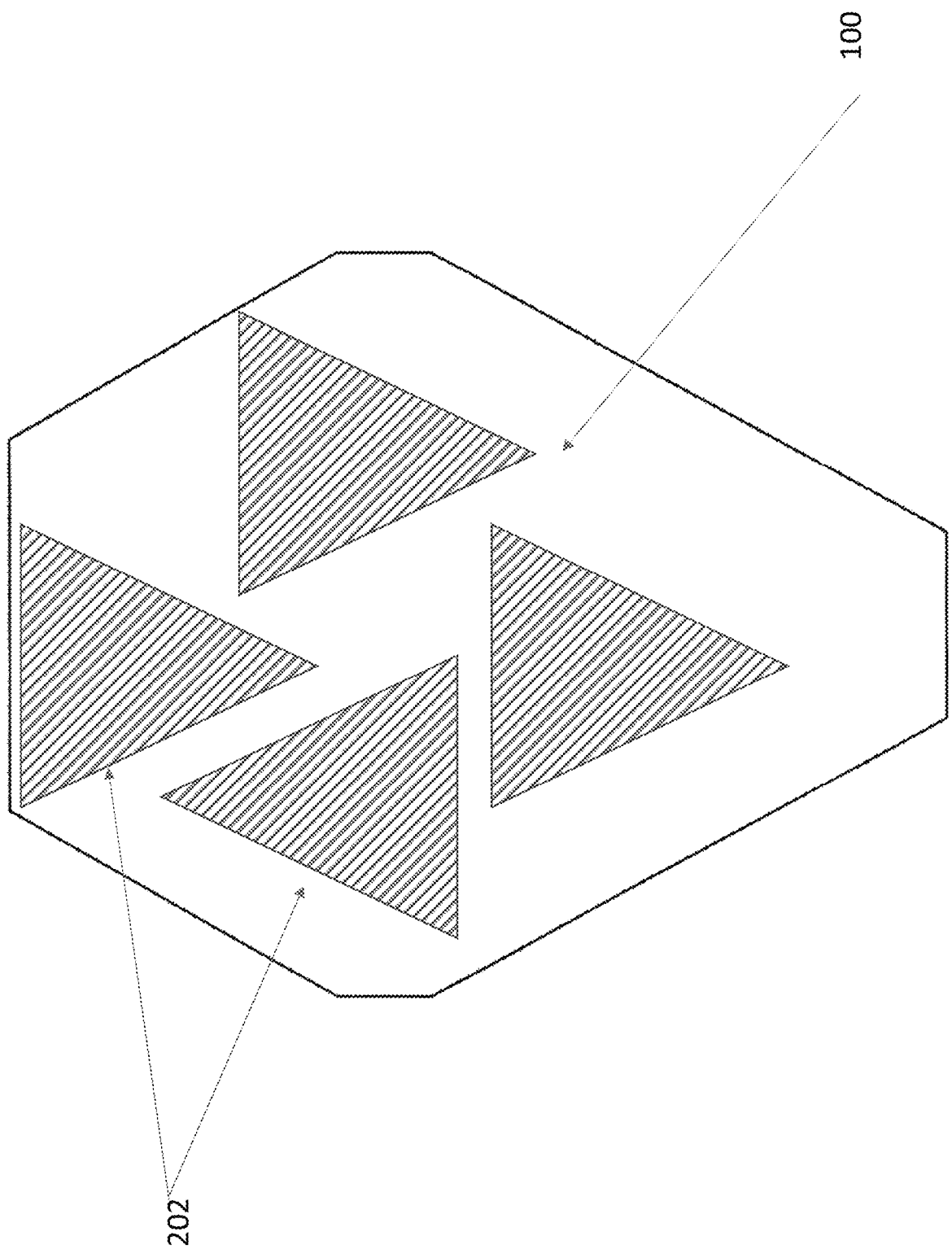
FIG. 2 shows a top planar view of the energy harvesting apparatus according to a particular embodiment of the present invention.

As shown in FIG. 2, the top surface of the energy harvesting apparatus incorporates one or more energy harvesting elements. In a further implementation, the surface of the energy harvesting apparatus has a substantially flat face. However, in one or more implementations, the top face of energy harvesting apparatus (or portion thereof) 100 may have striations, bumps, extrusions, divots, pits, depressions, channels, patterns or other artifacts etched or provided on its surface 202. For instance, the top surface may have patterns that direct or redirect light incident upon the top surface. In one or more implementations, the top surface functions as a lens that focuses light onto a particular portion of the energy harvesting apparatus 100. For instance, where the top surface is transparent to one or more forms of electromagnetic radiation, the top surface includes one or more focusing elements (e.g. lenses) that function to focus electromagnetic energy incident upon the top surface onto one or more energy harvesting elements located below the top surface.

Figure 3:
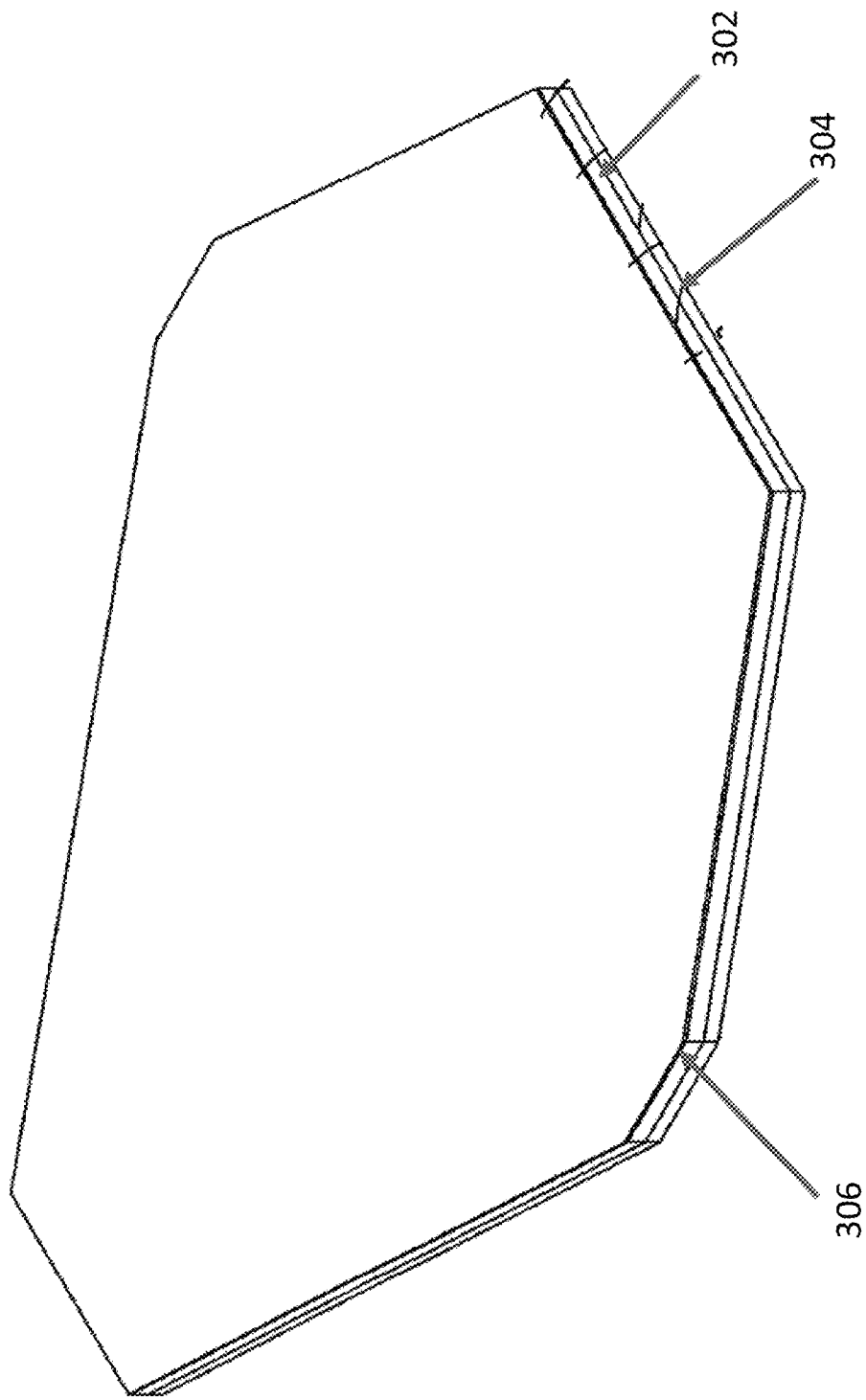
FIG. 3 shows a perspective view of the energy harvesting apparatus according to a particular embodiment of the present invention.

Turning to FIG. 3, each energy harvesting apparatus 100 includes at least one layer of energy harvesting devices 302 and a substrate layer 304. In one or more configurations multiple energy harvesting layers are stacked or arranged vertically upon one another. In a configuration where there are multiple layers of energy harvesting devices, each subsequent layer is configured with electrical and data connections to the adjacent layers and ultimately the substrate layer 304.

This composite of energy harvesting devices or elements and the substrate layer 304 are, in one implementation, encased or otherwise sealed in a shell or encasement. In one implementation, the encasement is a UV-VIS-NIR wavelength transparent encasement 306. In this configuration, the encasement 306 functions as the top surface described with respect to FIG. 2.

In additional implementations the encasement 306 is transparent to low and/or high frequency electromagnetic waves. For instance, the encasement is transparent to light in the visible wavelength, infrared, ultraviolet, radio, television, microwave and/or x-ray portions of the electromagnetic spectrum. In a particular implementation, the encasement 306 is formed of a plastic, metal, composite, resin, or other material. In a further implementation, the encasement is formed, at least in part, of self-healing polymer or one or more elastomer materials.

As shown in FIG. 3, each energy harvesting apparatus 100 includes one or more energy harvesting devices or elements positioned at layer 302. For instance, and in no way limiting, the energy harvesting devices that are positioned or included in a first or subsequent layer 302 are one or more devices configured to generate electrical energy from electromagnetic energy. For example, the energy harvesting devices 302 can be a collection of solar cells or other photovoltaic cells, thermoelectric generators, Radio Frequency (RF) energy harvesters and like. Alternatively, the energy harvesting devices positioned at layer 302 includes one or more devices configured to generate electrical energy from pressure, vibration or other sources of mechanical energy. In one configuration, the electrical energy harvesting devices 302 are comprised of piezoelectric elements configured to convert mechanical energy into electrical energy.

In a particular implementation, the energy harvesting devices positioned at layer 302 includes a plurality of quantum dot solar cells (QDSCs). Those possessing an ordinary level of requisite skill in the relevant art will appreciate that QDSCs are solar cells that use quantum dots as the absorbing photovoltaic material. Without being limited to any particular theory of operation, quantum dots have bandgaps that are tunable across a wide range of energy levels. These energy levels are tunable by changing the size of the quantum dots, which in turn defines the bandgap. For example, a single junction implementation using lead sulfide (PbS) based colloidal quantum dots (CQD) have bandgaps that can be tuned into the far infrared. Traditional solar cells have difficulty producing electricity from light in infrared frequencies.

In a further implementation, the photovoltaic cells are quantum dot solar cells. In yet a further implementation, the quantum dot based solar cells that are arranged or positioned on layer 302 are tuned to absorb electromagnetic energies in the infrared, and far-infrared spectrums. Alternatively, in one or more implementations, a portion of the energy harvesting devices are positioned on layer 302 and are configured to be tuned to a given spectrum range.

In a further implementation, where a second or subsequent energy harvesting layer is provided, the subsequent layer is disposed between the first energy harvesting layer 302 and the substrate layer 304. Here, this subsequent layer generates additional electricity using additional energy harvesting devices.

In one non-limiting implementation, the subsequent layer includes a plurality of thermoelectric generators. Those possessing an ordinary level of skill in the requisite art will appreciate that thermoelectric generators (TEMs) are devices that convert a temperature difference directly into an electromotive force. The greater the difference in temperature between a hot side and a cold side of a TEM, the more electrical power will be produced by the TEM in response thereto. In one configuration, the subsequent layer is used to harvest excess heat or thermal energy absorbed by photovoltaic based energy harvesting devices located in the first energy harvesting layer 302. Here, the subsequent energy generating layer provides additional electrical energy above that produced by the first energy harvesting layer 302 alone. In one or more alternative configurations, a portion of the subsequent layer includes one or more heat sinks or other heat dissipating devices that are disposed away from the portion of the subsequent layer in contact with the energy generating layer immediately adjacent to it.

In yet a further implementation, an alternative or further subsequent energy harvesting layer is provided. Here the electric energy generating devices of the alternative or subsequent energy harvesting layer is composed of electrical energy generating devices that collect RF and microwave signals and generate electricity. In one particular implementation, the additional or alternative layer includes one or more rectifying antenna devices. In a particular configuration, where electromagnetic radiation of a given spectra (e.g. microwave spectrum) such antenna are configured to cause the induction of a current in one or more energy harvesting or storage devices. In one particular implementation, the energy harvesting devices includes one or more metamaterials configured to generate electrical energy from RF emissions, such as through the use of one or more nano-materials.

Those possessing an ordinary level of skill in the requisite art will appreciate that rectifying antenna (rectennas) are used to convert output from an antenna to DC current. For example, when a broadband antenna is connected directly to a rectifying circuit, electrical energy may be harvested over a broad spectrum of EM frequencies. Here, the electrical energy generators are configured to receive EM frequencies from a microwave or other RF frequency source and generate usable amount of electrical energy. For instance, the alternative or subsequent energy harvesting layer described herein utilize rectifying antennas to provide steady or intermittent power to one or more control processors or circuits in order to manage, monitor and communicate the flow of energy generated in some or all of the energy generating layers.

Returning to FIG. 3, a substrate 304 is provided beneath the energy harvesting device layer 302. The substrate 304 can be formed of any material such as, but not limited to, metals, plastics, resins, composite materials, natural products or any combination thereof. In a further implementation, the substrate 304 includes one or more self-healing polymers or elastomer materials configured to impart self-healing functionality to the substrate 304.

In one, non-limiting configuration, the substrate 304, in one implementation, includes one or more direct electrical connections. For example, each energy harvesting device in an energy harvesting device layer 302 has a dedicated or independent connection to the substrate 304. In an alternatively implementation, the substrate includes power and data connections to one or more common buses, or conduits that connect to some or all of the energy harvesting devices that are located in any given energy harvesting layer 302. In this configuration, a collection of energy harvesting devices is connected to one another serially or in parallel, so as to pass data and electricity to a common interface. In a further implementation, the substrate also includes direct electrical and data connections to one or more output devices such as control and routing module hubs 404 and 406.

In a further implementation, the substrate 304 includes one or more data processors, power management systems, control circuity, inverters, amplifiers, batteries, or other components to store or manipulate the electrical energy generated by the energy harvesting devices. In a further implementation, the substrate 304 includes microprocessors or other devices to communicate with the one or more energy harvesting devices of one or more energy harvesting layer(s) 302 and control and routing modules 404 and 406.

Figure 4:
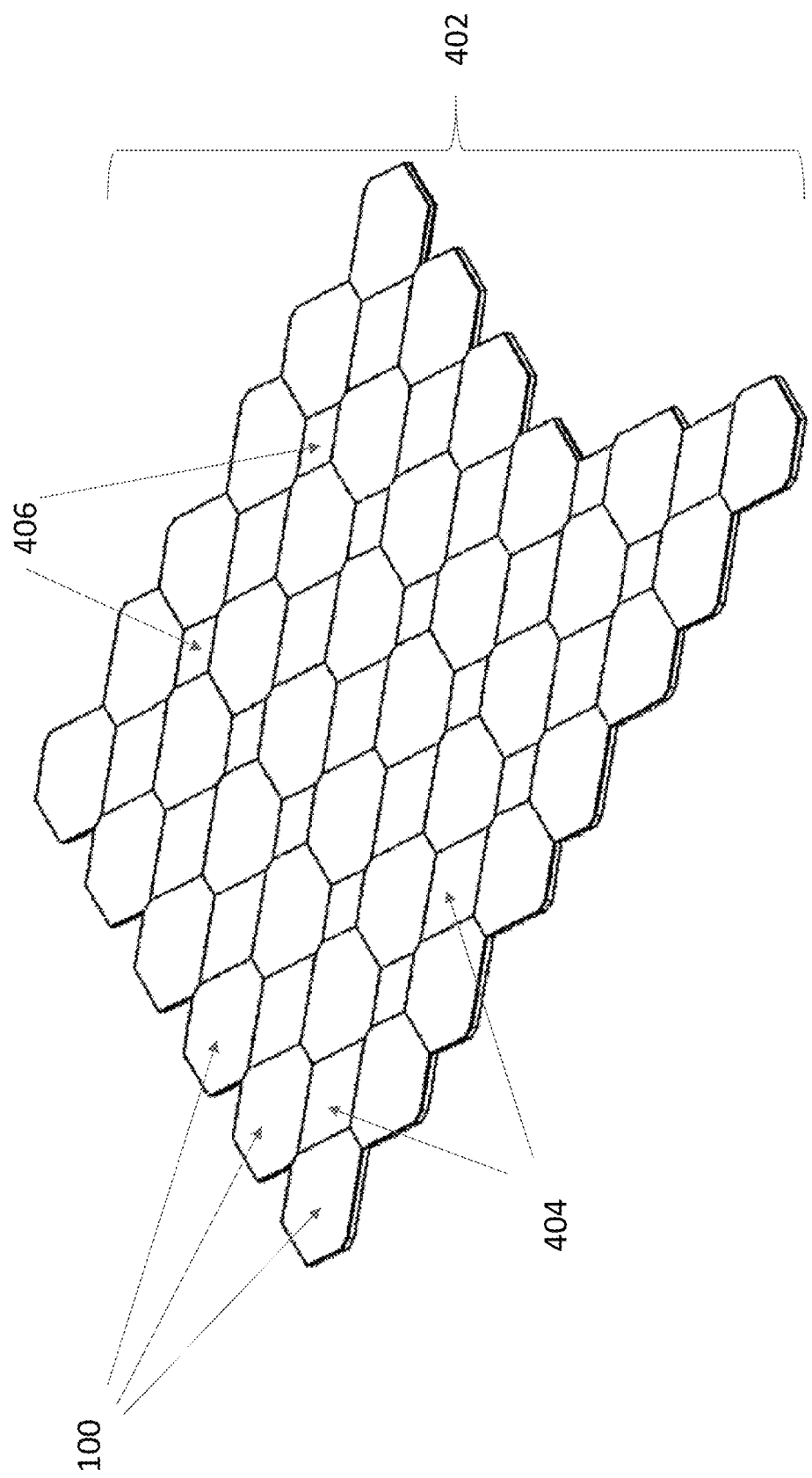
FIG. 4 shows a general overview of a plurality of energy harvesting apparatus interconnected according to a particular embodiment of the present invention.

As shown in FIG. 4, the energy harvesting apparatus 100 are interlocked or connected to one another to form a larger structure 402. In the illustrated implementation, the power and data connections for each of the energy harvesting apparatus 100 are passed to a controlling hub 404, 406. Here, the controlling hubs are configured to interlock with several energy harvesting apparatus 100. In one particular implementation, the controlling hubs 404, 406 are configured with one or more electrical and data connections to receive energy and data generated by the energy harvesting apparatus 100. In a further implementation, the controlling hubs 404, 406 are configured with one or more processors, or other control circuitry to send and receive data from the energy harvesting apparatus 100 that are adjacently interlocked. In one or more further arrangements, the controlling hubs 404 and 406 are configured with one or more sensors to monitor the overall performance and health of each energy harvesting apparatus 100 interfaced with the hub. In one or more additional configurations, the controlling hubs are configured with output interfaces that transfer or transmit the electrical energy generated by the energy harvesting devices 100 to a storage facility, electrical grid or electrically powered device.

Figure 5:
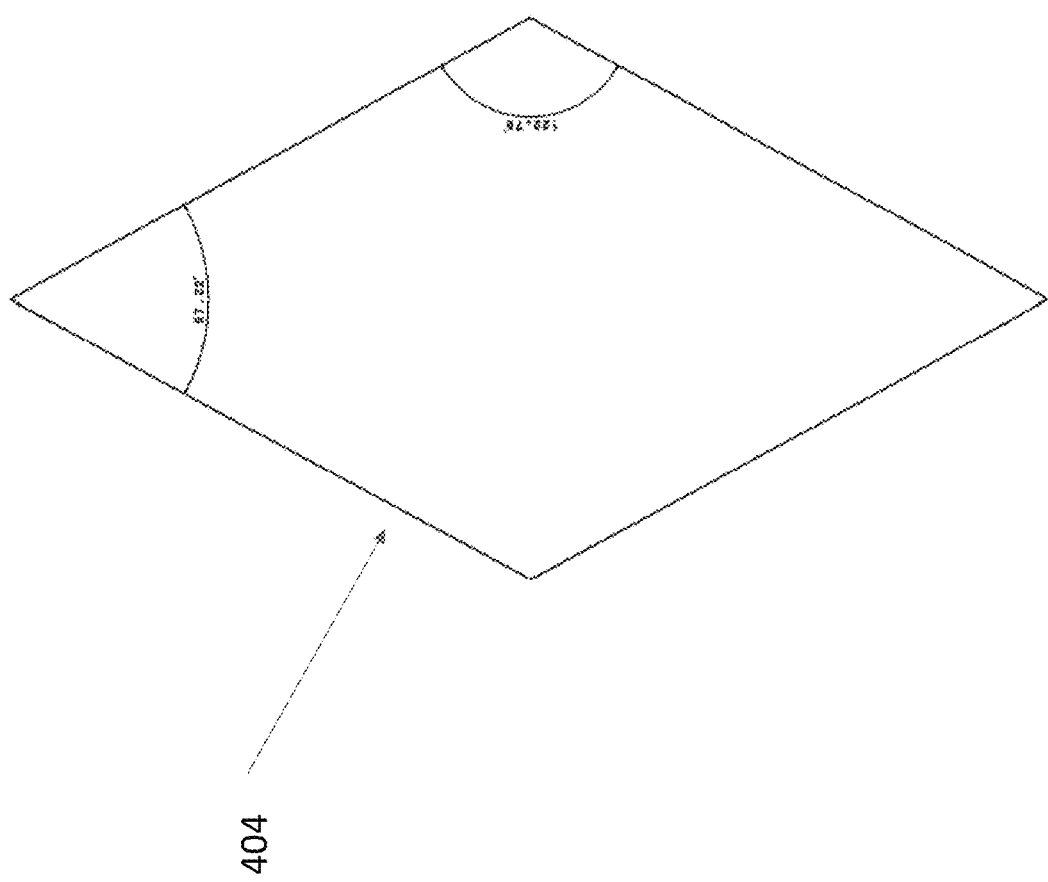
FIG. 5 shows a general overview of control and routing module according to a particular embodiment of the present invention.
Figure 6:
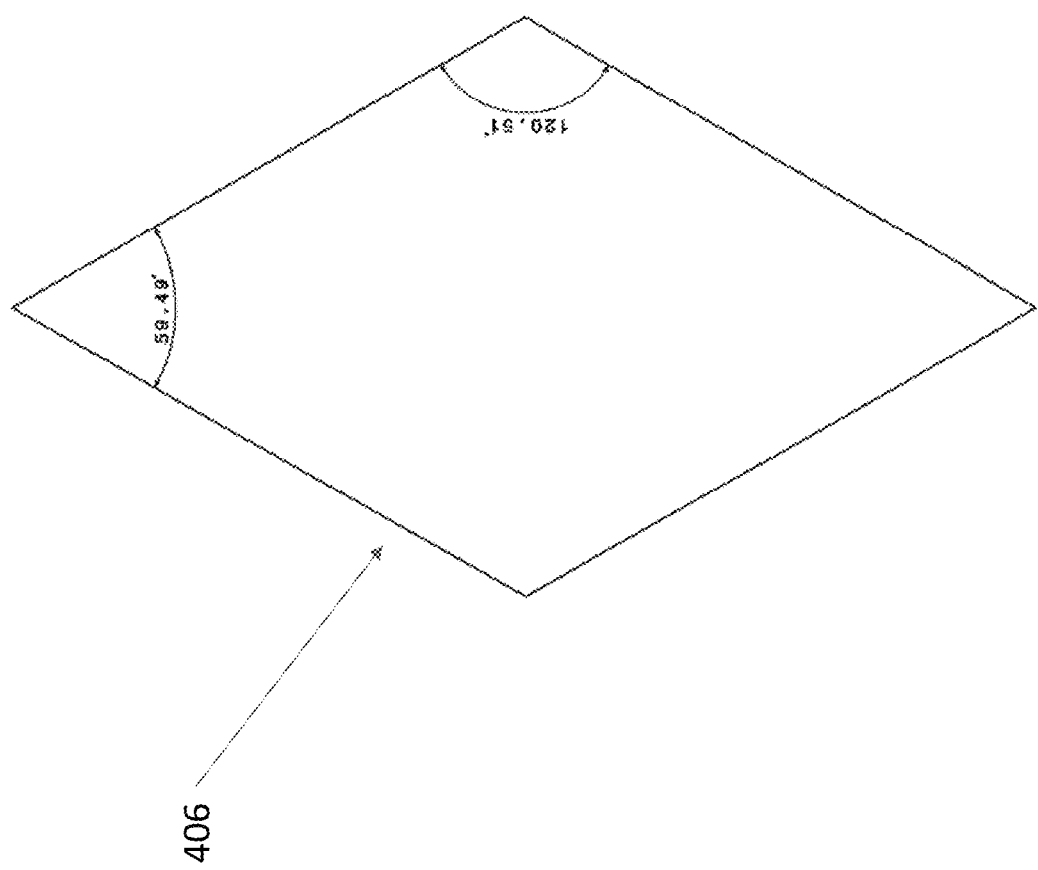
FIG. 6 shows an alternative control and routing module according to a particular embodiment of the present invention.

As seen in FIGS. 5 and 6, the controlling hubs can be configured to interface with four energy harvesting devices that are arranged such that the 8a length sides are facing one another, as with controlling hub 404 illustrated in FIG. 5. Alternatively, where the energy harvesting cells are arranged such that the 8a length sides of each energy harvesting apparatus 100 is facing away from one another. Here, the smaller control hub 406 is used to connect the energy harvesting apparatus, as in FIG. 6.

Figure 7:
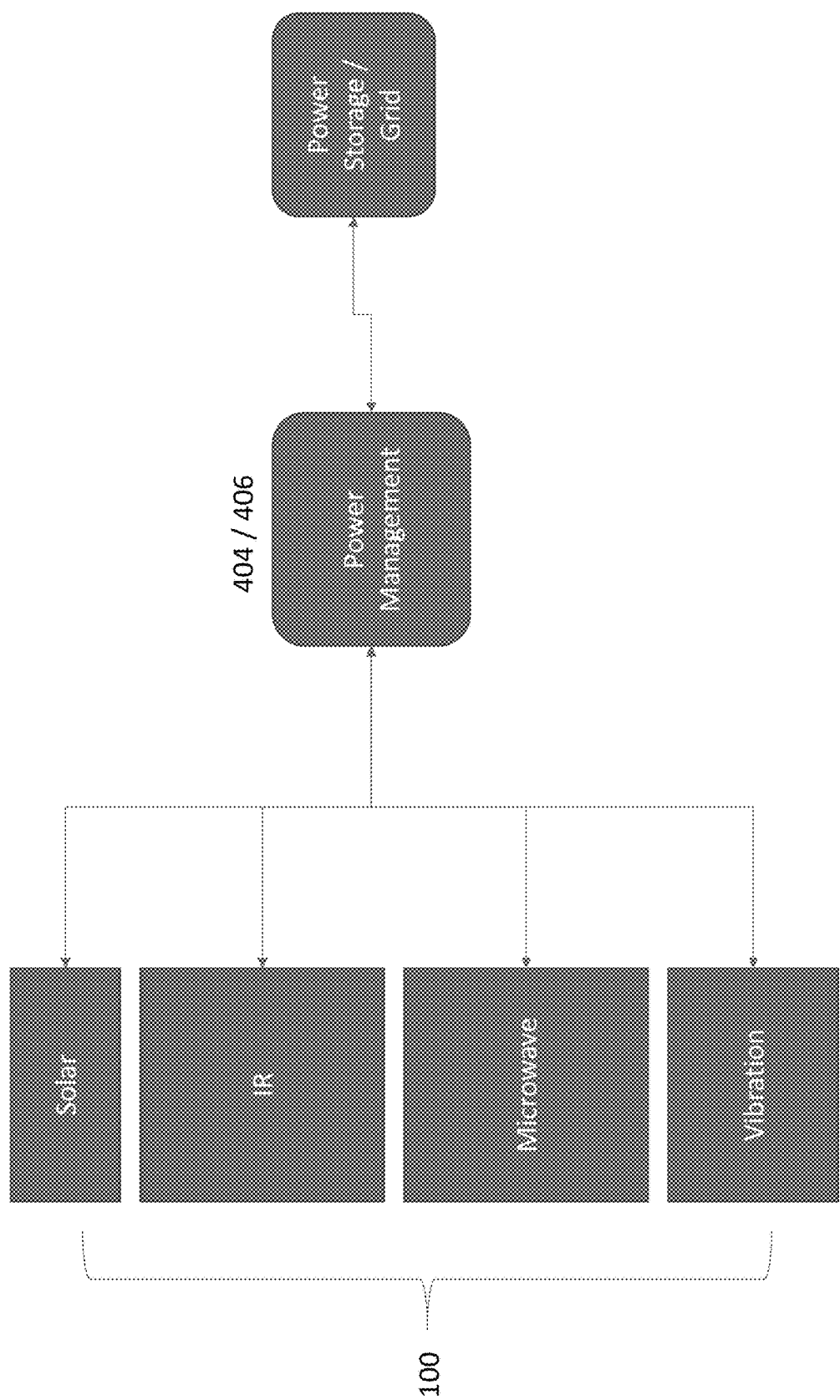
FIG. 7 shows various implementations of the energy generating and control and routing modules according to a particular embodiment of the present invention.

As shown in further detail with respect to FIG. 7, the energy harvesting devices are collectively labeled as 100 are configured to output generated electrical energy to one or more control hubs 406/404. In turn, the energy directed to the control hubs is combined or directly routed to an intended destination based on one or more operative conditions. For example, in one or more configurations the control hubs are configured by one or more software modules executing on a processor to combine one or more flows of electrical energy generated by the one or more layers of the energy harvesting device into a single flow. For instance, where the photovoltaic cells are generating electricity at an insufficient current, the current flow generated by a secondary or additional energy harvesting layer of the same harvesting device 100, or a different layer 302 of a different harvesting device that is connected to the same hub, can be added to the current generated by the photovoltaic elements of an energy harvesting layer of an energy harvesting device.

For instance, the respective currents generated by the various layers of energy generating devices can be combined through the control or operation of one or more software-controlled or hardware based switches based on a measurement of the present current generated and the intended use of the generated current. In an alternative configuration, the control hubs 406 and/404 are configured to route the energy generated by the one or more layers to an energy storage facility, device or configuration. For instance, where the energy generated by one or more layers (alone or combined) meets a pre-determined threshold value, any excess current generated by additional energy harvesting layers is directed to a power reserve, such as a battery or capacitor or supercapacitor or combination thereof, or an array of such elements.

By way of explanations, the processor or computers described herein refer to one or more computing devices, such as a commercially available microprocessor, processing cluster, integrated circuit, computer on chip or other data processing device. In one or more configurations, the processor is one or more components of a cellphone, smartphone, notebook or desktop computer configured to directly, or through a communication linkage, receive data related to the status of the components or elements described therein, including though one or more direct or remote connections to various energy management, current flow, charge rates, battery levels, switches, and other power distribution elements. The processor is configured with code executing therein to access various peripheral devices and network interfaces. For instance, the processor is configured to communicate over the Internet with one or more remote servers, computers, peripherals or other hardware using standard or custom communication protocols and settings (e.g., TCP/IP, etc.).

In one configuration, the processor is a portable computing device such as an Apple iPad/iPhone® or Android® device or other commercially available mobile electronic device executing a commercially available or custom operating system, e.g., MICROSOFT WINDOWS, APPLE OSX, UNIX or Linux based operating system implementations. In other embodiments, the processor is, or includes, custom or non-standard hardware, firmware or software configurations. For instance, the processor comprises one or more of a collection of micro-computing elements, computer-on-chip, home entertainment consoles, media players, set-top boxes, prototyping devices or "hobby" computing elements. The processor can comprise a single processor, multiple discrete processors, a multi-core processor, or other type of processor(s) known to those of skill in the art, depending on the particular embodiment.

In one or more embodiments, the processor is directly or indirectly connected to one or more memory storage devices (memories) to form a microcontroller structure. The memory is a persistent or non-persistent storage device (such as a single IC based memory) that is operative to store the operating system in addition to one or more of software modules. In accordance with one or more embodiments, the memory comprises one or more volatile and non-volatile memories, such as Read Only Memory ("ROM"), Random Access Memory ("RAM"), Electrically Erasable Programmable Read-Only Memory ("EEPROM"), Phase Change Memory ("PCM"), Single In-line Memory ("SIMM"), Dual In-line Memory ("DIMM") or other memory types. Such memories can be fixed or removable, as is known to those of ordinary skill in the art, such as through the use of removable media cards or modules. In one or more embodiments, the memory of the processor provides for the storage of application program and data files. One or more memories provide program code that the processor reads and executes upon receipt of a start, or initiation signal. The computer memories may also comprise secondary computer memory, such as magnetic or optical disk drives or flash memory, that provide long term storage of data in a manner similar to the persistent memory device. In one or more embodiments, the memory of the processor provides for storage of application programs or modules and data files when needed.

As shown, memory and persistent storage are examples of computer-readable tangible storage devices. A storage device is any piece of hardware that is capable of storing information, such as data, program code in functional form, and/or other suitable information on a temporary basis and/or permanent basis. In one or more embodiments, memory includes random access memory (RAM). RAM may be used to store data such as measurement data in accordance with the present invention. In general, memory can include any suitable volatile or non-volatile computer-readable storage device. Software and data are stored in persistent storage for access and/or execution by processors via one or more memories of memory.

In a particular embodiment, persistent storage includes a magnetic hard disk drive. Alternatively, or in addition to a magnetic hard disk drive, persistent storage can include a solid state hard drive, a semiconductor storage device, read-only memory (ROM), erasable programmable read-only memory (EPROM), flash memory, or any other computer-readable storage devices capable of storing program instructions or digital information.

The database may be embodied as solid-state memory (e.g., ROM), hard disk drive systems, RAID, disk arrays, storage area networks ("SAN"), network attached storage ("NAS") and/or any other suitable system for storing computer data. In addition, the database may comprise caches, including database caches and/or web caches. Programmatically, the database may comprise flat-file data store, a relational database, an object-oriented database, a hybrid relational-object database, a key-value data store such as HADOOP or MONGODB, in addition to other systems for the structure and retrieval of data that are well known to those of skill in the art.

The media used by persistent storage may also be removable. For example, a removable hard drive may be used for persistent storage. Other examples include optical and magnetic disks, thumb drives, and smart cards that are inserted into a drive for transfer onto another computer-readable storage medium that is also part of persistent storage.

While this specification contains many specific embodiment details, these should not be construed as limitations on the scope of any embodiment or of what can be claimed, but rather as descriptions of features that can be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

The terminology used herein is for the purpose of describing particular embodiments only and is not intended to be limiting of the invention. As used herein, the singular forms "a", "an" and "the" are intended to include the plural forms as well, unless the context clearly indicates otherwise. The use of "including," "comprising," or "having," "containing," "involving," and variations thereof herein, is meant to encompass the items listed thereafter and equivalents thereof as well as additional items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. Also, the phraseology and terminology used herein is for the purpose of description and should not be regarded as limiting.

Particular embodiments of the subject matter described in this specification have been described. Other embodiments are within the scope of the following claims Citation of any above publications, patents, patent applications or documents is not intended as an admission that any of the foregoing is pertinent, nor does it constitute any admission as to the contents or date of these publications or documents. All references cited herein are incorporated by reference to the same extent as if each individual publication and references were specifically and individually indicated to be incorporated by reference.

While the invention has been particularly shown and described with reference to a preferred embodiment thereof, it will be understood by those skilled in the art that various changes in form and details may be made therein without departing from the spirit and scope of the invention. As such, the invention is not defined by the discussion that appears above, but rather is defined by the points that follow, the respective features recited in those points, and by equivalents of such features described here and in the Figures.

The invention claimed is:

1. An energy harvesting apparatus comprising, at least one energy harvesting cell, the cell comprising an irregular octagonal substrate supporting a least one electrical energy generating device, at least one control circuit for controlling at least the operation of the electrical energy generating device, wherein the energy harvesting cell is encased in a polymer and wherein the irregular octagonal substrate has two opposing first sides each having a length L, a second side orthogonal to both first sides having a length equal to 2L, a third side opposed from the second side having a length of 4L, wherein the width of the substrate between the two opposing first sides is 8L.

2. The energy harvesting apparatus of claim 1, wherein the substrate includes a first layer of photovoltaic cells.

3. The energy harvesting apparatus of claim 2 wherein the substrate includes an additional layer of energy generating devices disposed beneath the photovoltaic cell layer.

4. The energy harvesting apparatus of claim 3, wherein the additional layer of energy generating devices are thermoelectric generators.

5. The energy harvesting apparatus of claim 2, wherein the substrate includes a further layer of energy generating devices disposed beneath the additional layer.

6. The energy harvesting apparatus of claim 4, wherein the further layer of energy generating devices are metamaterials configured to generate electrical energy from RF emissions.

7. An energy harvesting apparatus comprising,
a. a plurality of energy harvesting cells, each cell comprising a substrate supporting a least one electrical energy generating device, at least one control circuit for controlling at least the operation of the electrical energy generating device, wherein the energy harvesting cell is encased in a polymer b. wherein the substrate has two opposing first sides each having a length L, a second side orthogonal to both first sides having a length equal to 2L, a third side opposed from the second side having a length of 4L, wherein the width of the substrate between the two opposing first sides is 8L.

8. The energy harvesting apparatus of claim 7 wherein at least two of the plurality of energy harvesting cells are aligned such that one of each of their respective L length sides are aligned.

9. The energy harvesting apparatus of claim 7, wherein the 2L side of a third energy harvesting cell is aligned with the 2L side of one of the two of the plurality of energy harvesting cells.

10. The energy harvesting apparatus of claim 7, further comprising a control module, where the control module is electrically coupled to a side of the energy harvesting cell that is between a L length side and a 2L length side.

11. The energy harvesting apparatus of claim 10, further comprising a secondary control module, where the secondary control module is electrically coupled to a side of the energy harvesting cell that is between a L length side and a 4L length side.

12. The energy harvesting apparatus of claim 8, wherein the substrate includes a first layer of photovoltaic cells.

13. The energy harvesting apparatus of claim 7, wherein the substrate includes an additional layer of energy generating devices disposed beneath the photovoltaic cell layer.

14. The energy harvesting apparatus of claim 13, wherein the additional layer of energy generating devices are thermoelectric generators.

15. The energy harvesting apparatus of claim 7, wherein the substrate includes a further layer of energy generating devices disposed beneath the additional layer.

16. The energy harvesting apparatus of claim 15, wherein the further layer of energy generating devices are metamaterials configured to generate electrical energy from RF emissions.

17. An energy harvesting system comprising,
a. a plurality of energy harvesting cells, each of the cells comprising at least two vertically stacked irregular octagonal layers of electrical energy generating devices, wherein the first of the at least two vertically stacked layers incorporates at least one photovoltaic device configured to absorb light in the visible spectrum, and an at least a second layer includes an energy generation device configured to absorb light in the infrared spectrum, wherein the energy generation device includes one or more lead sulfide based colloidal quantum dots having a bandgap that is tuned to far infrared spectrum;
b. a control circuit for receiving at least the energy generated from the at least two vertically stacked layers, where in the control circuit includes means for directed the received energy to one of a plurality of devices based on one or more operational parameters.

* * * * *